United States Patent [19]

Hahn et al.

[11] Patent Number: 4,786,236
[45] Date of Patent: Nov. 22, 1988

[54] ROTOR, ESPECIALLY FOR ROTARY WING AIRCRAFT

[75] Inventors: Michael Hahn, Ottobrunn; Gerald Kuntze-Fechner, Munich, both of Fed. Rep. of Germany

[73] Assignee: Messerschmitt-Boelkow-Blohm GmbH, Munich, Fed. Rep. of Germany

[21] Appl. No.: 107,241

[22] Filed: Oct. 9, 1987

[30] Foreign Application Priority Data

Oct. 16, 1986 [DE] Fed. Rep. of Germany ......................... 3635180622

[51] Int. Cl.$^4$ .............................................. B64C 27/50
[52] U.S. Cl. .................................. 416/143; 416/134 A; 416/138
[58] Field of Search ............... 416/143, 142 R, 134 A, 416/138 A, 141

[56] References Cited

U.S. PATENT DOCUMENTS

| | | | |
|---|---|---|---|
| 3,101,785 | 8/1963 | Leoni | 416/143 |
| 3,321,020 | 5/1967 | Pfleiderer et al. | 416/143 X |
| 3,771,924 | 11/1973 | Buchstaller | 416/143 X |
| 3,874,817 | 4/1975 | Ferris | 416/143 |
| 4,227,859 | 10/1980 | Gouzien et al. | 416/134 A |
| 4,592,701 | 6/1986 | Hahn et al. | 416/138 A X |

FOREIGN PATENT DOCUMENTS

| | | | |
|---|---|---|---|
| 3121412 | 12/1982 | Fed. Rep. of Germany | 416/143 |
| 3316019 | 11/1984 | Fed. Rep. of Germany | 416/134 A |

Primary Examiner—Everette A. Powell, Jr.
Attorney, Agent, or Firm—W. G. Fasse; D. H. Kane, Jr.

[57] ABSTRACT

A helicopter rotor with foldable blades has, in the hub and blade roots, holes for mounting the blade roots to the rotor hub with connecting bolts passing through these holes in the operating position of the blades. Additionally, at least one blade of two blades and the hub have aligned holes for holding the respective foldable blade in a folded position, whereby one of the regular connecting bolts passes through the aligned holes, which are located as close as possible to the pivoting point connecting a pitch angle control rod to a pitch angle control sleeve.

3 Claims, 2 Drawing Sheets

ROTOR, ESPECIALLY FOR ROTARY WING AIRCRAFT

FIELD OF THE INVENTION

The invention relates to a rotor, especially for a rotary wing aircraft. Such rotors have a hub and rotor wings each having a radially outer blade section, an intermediate neck section, and a root section bolted to the hub.

DESCRIPTION OF THE PRIOR ART

In rotors of the above type the blade neck section is soft or yielding, at least relative to torsion loads, to permit the blade pitch angle adjustments which are made with the aid of a blade pitch angle adjustment member extending coaxially to the torsion soft blade neck section. The radially outer end of the pitch angle control member is rigidly secured to the wing section while the radially inner end of the control member is movably secured to the blade root section, for example, by a damping device. The blade pitch angle control is accomplished with a control rod hinged to the radially inner end of the control member, such as a sleeve extending coaxially with the blade neck section.

In rotors of the above type it is desirable to fold one blade of a pair of blades following each other in the rotational direction into a folded position substantially in parallel to the other blade of the pair. In conventional rotors such folding is not possible simply after pulling one or all blade connecting bolts which secure the blade root to the hub. At least it is necessary to also disconnect the blade pitch angle control element or a respective blade control level, from the respective control rod of the blade pitch angle control device. Such disconnection in the pitch angle control transmission link can result in faulty adjustments which in turn may result in wing tracking problems after the blades have been moved back out of their folded condition into the operating condition.

OBJECTS OF THE INVENTION

In view of the foregoing it is the aim of the invention to achieve the following objects singly or in combination:

to avoid in a rotor structure of the type described above the need for the separation in the control transmission for the blade pitch angle adjustment when it is intended to bring one blade of a pair of blades into a folded position;

to assure the proper blade tracking so that all blades have the same lead-lag plane after the folded blades have been brought back into the operating position; and to secure a folded blade in its folded position with at least one of the connecting bolts.

SUMMARY OF THE INVENTION

A rotor according to the invention is characterized in that a separate bore is provided in the rotor hub exclusively for securing a blade in its folded condition. This connecting bore is located in such a position that the rotor blade can be rotated about a connecting bolt inserted into the separate bore, whereby the connecting bolt functions as a hinge pin. The normal connection of the blade root to the rotor hub is first disconnected for the folding purpose. The connecting bolt functioning as a hinge pin in combination with the special location of the separate bore permits the folding through a determined folding angle without any separation in the blade pitch angle control linkage. The arrangement is such that the pivoting point between the blade pitch angle control element and the respective control rod can rotate along a circular arc having its center in the connecting bolt acting as a hinge pin. This circular arc is so located that at the beginning and at the end of a blade folding movement the circular arc would intersect a circular path along which the pivoted end of the separated, freely movable pitch angle control rod would move.

The invention makes sure that even where larger folding angles are required, the pivoted end of the control rod follows along a circular path that is within the free movements of the rotor blade. Since there is no coincidence between the just mentioned two circular paths, a pitch angle control movement is imposed on the respective rotor blade. However, this imposed movement is advantageous because it stabilizes the blade in its folded condition due to an elastically effective holding force imposed by the pitch angle adjustment movement of the blade during its folding motion.

Yet another advantage of the invention resides in the fact that the required structural components are minimal since it requires but an extra bore through the hub and through the blade root while one of the regular connecting bolts can be used for securing the blade in its folded condition.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
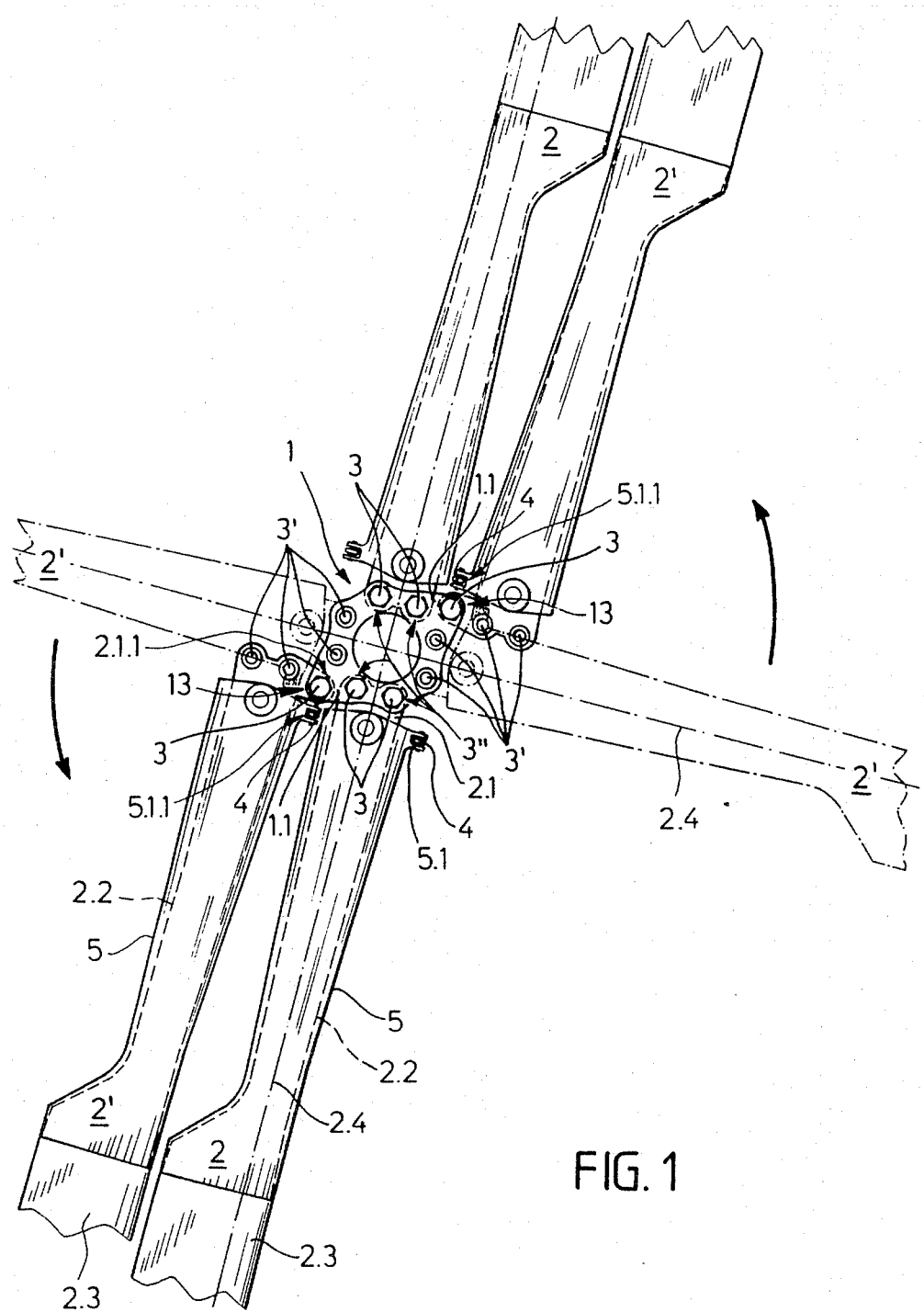
FIG. 1 is a top plan view onto a rotor with four wings, two of which are shown in the folded condition while their unfolded condition is shown by dash-dotted lines, and whereby the view direction extends in the direction of the rotational axis of the rotor.

FIG. 1 shows a rotor with four blades forming two pairs, each comprising a blade 2 and a blade 2'. The full line illustration shows one blade 2' of each pair in the folded condition. The dash-dotted lines show the blades 2' in the unfolded state. The two pairs of blades are located in the folded condition diametrically opposite each other. The blades are made, for example, of fiber reinforced synthetic materials. Bolts 3 passing through the rotor hub 1 and through the thickness of the blade root 2.1 secure each blade to the rotor hub 1 in a so-called rigid manner. In order to assure that the individual rotor blade 2, 2', or rather the respective blade wing 2.3 can be adjusted for the required blade pitch angle about its longitudinal, or rather radial axis 2.3, the blade neck 2.2 between the blade root 2.1 and the blade wing 2.3, is constructed to be relatively yielding to torsion loads. The desired torsional yielding is accomplished by a relatively longitudinal type of contruction of the blade neck 2.2 of fiber strands having a unidirectional fiber orientation in the longitudinal direction of the blade that is in the radial direction, relative to the rotational rotor axis.

Figure 3:
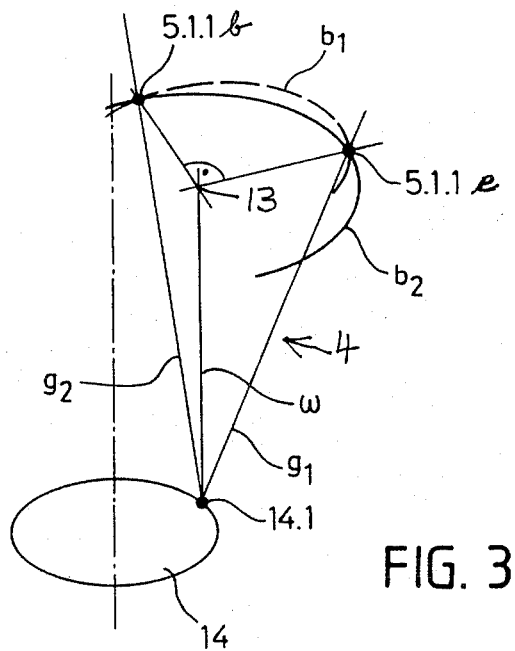
FIG. 3 is a side view of a motion diagram of a blade pitch angle control rod of a rotor blade when the rotor blade moves through its blade folding motion.

Due to the relatively large structural length of the torsionally yielding blade neck 2.2, the blade neck is bypassed by a blade angle adjustment element in the form of a so-called blade pitch angle adjustment sleeve 5 which is stiff against torsional load and which is rigidly connected with its radially outer end to the blade wing section 2.3. The control sleeve 5 extends coaxially to the blade neck 2.2 without touching the blade neck and the radially inner end of the control sleeve 5 reaches to the blade root 2.1 on which the radially inner end of the control sleeve 5 is movably supported. A blade pitch angle control rod 5.1 is hinged to the tension stiff control sleeve 5 in a conventional manner. A wobble plate 14, shown in FIG. 3, is conventionally used to operate the pitch angle control rod 4 for the adjustment of the blade pitch angle.

According to the invention, the blade root 2.1 of at least one of the blades of a pair 2, 2' is provided with an extension lug 2.1.1. A connecting bore 13 passes through this lug 2.1.1 in addition to the regular connecting bores 3'. The bore 13 also passes through a respective extension 1.1 of the rotor hub. The lug 2.1.1 is so located that the additional connecting bore 13 is located as close as possible to the pivot or hinging point 5.1.1 at which the pitch angle control rod 4 is hinged to the tension stiff control sleeve 5, or rather, the control lever 5.1 of the control sleeve 5. The bore 13 passes through the extension 5.1 of the rotor hub and through the thickness of the blade root 2.1. When the connecting bolts are removed, the blade 2' can be brought from the dash-dotted position into the full line position as shown in FIG. 1. One of the connecting bolts 3 is then inserted into the bore 13 to secure the blade in the folded condition. This is possible without the disconnection of the control rod 4 from its respective tension stiff control sleeve 5 or control lever 5.1.

The invention makes sure that the foldable blades 2' are absolutely freely movable into the folded rest position. For this purpose the individual connecting bore 13 is so located that the longitudinal axis ω of the bore 13 forms an angle bisector as shown in FIG. 3. The respective angle is enclosed between two straight lines $g_1$ and $g_2$ extending through the pivot point 14.1 between the wobble plate 14 and the control rod 4 and through the pivot point 5.1.1 between the control rod 4 and the tension stiff control sleeve 5 or its lever 5.1. The straight line $g_1$ marks the beginning 5.1.1b of a pitch angle adjustment movement. The straight line $g_2$ marks the end 5.1.1e of a pitch angle adjustment movement as shown in FIG. 3. These positioning conditions for the connecting bore 13 are preferable with regard to large folding angles. When small folding angles are involved, for example, in a rotor having an uneven number of rotor blades, these conditions need not necessarily be satisfied, or it is satisfactory to approximately meet these conditions. In the example of FIG. 3, $b_1$ designates that circular path on which the pivot point 5.1.1 travels during a pitch angle adjustment movement when the control rod 4 is disconnected from the control sleeve 5. This circular path $b_1$ intersects the circular path $b_2$ of the pivot point 5.1.1 at the beginning and at the end of a folding movement, whereby the path $b_2$ constitutes the movement according to the invention when the pivot 5.1.1 is not disconnected, in other words, when the rod 4 remains pivoted to the sleeve 5 during the folding movement.

Figure 2:
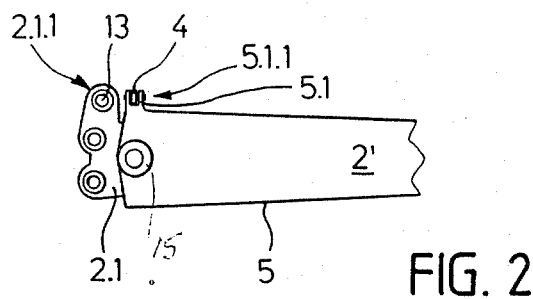
FIG. 2 shows the blade root end of one of the foldable wings of FIG. 1.

As mentioned, the additional connecting bore 13 according to the invention may be provided for each blade, whereby each blade would have its lug 2.1.1. In other words, the invention is not limited to providing only two foldable blades with the additional connecting bore as shown in FIG. 1. Normally, at least one of two blades following each other will have the additional connecting bore 13. The structural effort and expense is very small because all that is required is the above mentioned lug 2.1.1 as best seen in FIG. 2, at the respective blade root 2.1 and the extension 1.1 in the hub. The extension 1.1 may, for example, be a fork-shaped or double pronged projection through which the connecting bolt passing through the additional connecting bore 13 will also pass in the folded position of the respective blade 2'. The hub is equipped anyway with the connecting holes 3' and 3''. It is suitable to provide each bore 13 in the rotor hub 1 and also in the blade root 2.1 with a respective bearing bushing not shown, but made of hardened steel or the like.

A damping device 15 connects the inner end of the sleeve 5 movably to the blade root 2.1.

Although the invention has been described with reference to specific example embodiments, it will be appreciated, that it is intended to cover all modifications and equivalents within the scope of the appended claims.

What we claim is:

1. A rotor, especially for rotary wing aircraft, comprising a rotor hub and a plurality of rotor blades, each blade having a blade root, a blade neck, a blade wing section, and a torsion stiff blade pitch angle control sleeve, said blade neck being torsionally yielding for allowing a blade pitch angle adjustment movement, said blade neck being arranged between said blade root and said blade wing section, bolts and first bore means (3') connecting each rotor blade root to said rotor hub in an operating position, said torsion stiff blade pitch angle control sleeve extending coaxially around said torsionally yielding blade neck for transmitting blade pitch angle adjustment forces to said wing section, a radially outer end of said torsion stiff blade pitch angle control sleeve being rigidly connected to said blade wing section, means for securing a radially inner end of said torsion stiff blade pitch angle control sleeve to said blade root in a movable relative to said blade root, a blade angle adjustment rod (4), pivot means (5.1.1) journalling said blade pitch angle adjustment rod (4) to said torsion stiff blade pitch angle control sleeve (5) near said blade root, said rotor further comprising additional connecting bore means (13) for at least one rotor blade of two rotor blades of which one rotor blade follows the other rotor blade, said additional connecting bore means including one bore passing through said rotor hub and another bore passing through said blade root of said at least one rotor blade, said two bores aligning axially with each other along a bore axis for permitting folding the respective blade into a folded position and for holding the respective blade in an operative position, said additional bore means (13) being located on the same side as said pivot means and as close as possible to said pivot means, so that the respective blade pitch angle adjustment rod (4) with its pivot means can rotate along a circular arc having its center in said bore axis, whereby blade folding is possible without disconnecting said pivot means (5.1.1), said additional bore means being adapted for receiving one of said connecting bolts for holding the respective rotor blade in a folded position.

2. The rotor of claim 1, wherein said blade root of said at least one rotor blade root has a projecting lug (2.1.1), and wherein said rotor hub has an extension (1.1) located to register with said projecting lug (2.1.1) where said one rotor blade is in said folded position, said additional bore means extending through said extension (1.1) and through said lug (2.1.1).

3. The rotor of claim 1, wherein said at least one rotor blade has an extension lug (2.1.1) reaching with its free end to a point next to said pivot means (5.1.1), wherein said rotor hub has an extension (1.1) also reaching with its free end to said point next to said pivot means for facilitating the axial alignment of said two bores of said additional bore means with each other at all times in the unfolded and folded positions.

* * * * *

UNITED STATES PATENT AND TRADEMARK OFFICE
CERTIFICATE OF CORRECTION

PATENT NO. : 4,786,236
DATED : November 22, 1988
INVENTOR(S) : Michael Hahn, Gerald Kuntze-Fechner It is certified that error appears in the above-identified patent and that said Letters Patent is hereby corrected as shown below:

In [75] Inventors, line 2, replace "Munich" by --Bad Wiessee--;

Column 4, line 46, claim 1, line 18, after "movable" insert --manner--;

Column 4, line 47, claim 1, line 19, after "blade" insert --pitch--;

Column 5, line 7, claim 2, line 5, replace "where" by --when--.

Signed and Sealed this

Eleventh Day of April, 1989

Attest:

DONALD J. QUIGG

Attesting Officer

Commissioner of Patents and Trademarks